(12) United States Patent
Wu et al.

(10) Patent No.: US 11,641,533 B2
(45) Date of Patent: May 2, 2023

(54) ON-CHIP MULTIPLEXING PIXEL CONTROL CIRCUIT

(71) Applicant: CHINA ELECTRONICS TECHNOLOGY GROUP CORPORATION NO. 44 RESEARCH INSTITUTE, Chongqing (CN)

(72) Inventors: Zhijun Wu, Chongqing (CN); Changju Liu, Chongqing (CN); Yiqiang Li, Chongqing (CN)

(73) Assignee: China Electronics Technology Group Corporation No.44 Research Institute, Chongqing (CN)

( * ) Notice: Subject to any disclaimer, the term of this patent is extended or adjusted under 35 U.S.C. 154(b) by 182 days.

(21) Appl. No.: 17/414,832

(22) PCT Filed: Apr. 22, 2020

(86) PCT No.: PCT/CN2020/086077
§ 371 (c)(1),
(2) Date: Jun. 16, 2021

(87) PCT Pub. No.: WO2021/114542
PCT Pub. Date: Jun. 17, 2021

(65) Prior Publication Data
US 2022/0311963 A1 Sep. 29, 2022

(30) Foreign Application Priority Data

Dec. 11, 2019 (CN) .......................... 201911267442.1

(51) Int. Cl.
*H04N 25/75* (2023.01)
*H04N 25/74* (2023.01)
*H04N 25/771* (2023.01)

(52) U.S. Cl.
CPC ............. *H04N 25/75* (2023.01); *H04N 25/74* (2023.01); *H04N 25/771* (2023.01)

(58) Field of Classification Search
CPC ...... H04N 25/75; H04N 25/74; H04N 25/771; H04N 25/533; H04N 25/76
See application file for complete search history.

(56) References Cited

U.S. PATENT DOCUMENTS

| 6,920,078 B2 * | 7/2005 | Cho | ..................... H04N 3/1512 348/E3.018 |
|---|---|---|---|
| 8,427,566 B2 * | 4/2013 | Fujita | ................... H04N 25/626 348/308 |

(Continued)

FOREIGN PATENT DOCUMENTS

| CN | 101231191 A | 7/2008 |
|---|---|---|
| CN | 202841351 U | 3/2013 |

(Continued)

OTHER PUBLICATIONS

PCT/ISA/210 from PCT/CN2020/086077 dated Sep. 2, 2020.

*Primary Examiner* — Nhan T Tran
(74) *Attorney, Agent, or Firm* — Santa Fe IP, LLC (57) ABSTRACT

The present invention belongs to the technical field of CMOS image sensors, and particularly relates to an on-chip multiplexing pixel control circuit for controlling a super-large area array splicing CMOS image sensor. The multiplexing type pixel control circuit includes at least one multiplexing unit, each multiplexing unit includes L levels of serial pixel control sub-circuits and a windowing address gating circuit. Through the different positions of the multiplexing units in the whole chip, the group address buffer circuits of the multiplexing units generate different group address reference signals, which are compared with a group decoding address generated in a group decoding address buffer circuit to realize group decoding and gate the multi- (Continued)

plexing unit. Meanwhile, the serial pixel control sub-circuit in the multiplexing unit is compared with a row decoding address to realize exposure and readout control of a corresponding row of the multiplexing unit. The control circuit of the present invention is simple in structure and reliable in control, and has excellent expandability and multiplexing capability, which can be applied to CMOS image sensor chip circuits with different area array scales.

6 Claims, 5 Drawing Sheets

(56) References Cited

U.S. PATENT DOCUMENTS

| | | | |
|---|---|---|---|
| 9,888,185 B1 * | 2/2018 | Wang | H04N 25/585 |
| 2008/0284876 A1 * | 11/2008 | Makino | H04N 25/441 |
| | | | 348/E5.091 |
| 2012/0104232 A1 | 5/2012 | Hwang | |

FOREIGN PATENT DOCUMENTS

| | | | | |
|---|---|---|---|---|
| CN | 104729722 A | | 6/2015 | |
| CN | 104796636 A | * | 7/2015 | H04N 5/353 |
| CN | 104796636 A | | 7/2015 | |
| CN | 104796640 A | | 7/2015 | |
| CN | 109068023 A | | 12/2018 | |
| CN | 109670238 A | * | 4/2019 | G06F 30/39 |
| CN | 109670238 A | | 4/2019 | |
| EP | 1058822 A1 | | 12/2000 | |
| KR | 2012-0046905 A | | 5/2012 | |

* cited by examiner

| | common decoding address | group decoding address | row decoding address | |
|---|---|---|---|---|
| decimal | <14:0> | <3:0> | <9:0> | |
| 0d | 00,000,000,000,000 | | 0,000,000,000 | |
| 1d | 00,000,000,000,001 | | 0,000,000,001 | |
| A_1 ⋮ | ⋮ | 0000 | ⋮ | A_1 |
| 1022d | 00,001,111,111,110 | | 1,111,111,110 | |
| 1023d | 00,001,111,111,111 | | 1,111,111,111 | |
| 1024d | 00,010,000,000,000 | | 0,000,000,000 | |
| 1025d | 00,010,000,000,001 | | 0,000,000,001 | |
| A_2 ⋮ | ⋮ | 0001 | ⋮ | A_2 |
| 2046d | 00,011,111,111,110 | | 1,111,111,110 | |
| 2047d | 00,011,111,111,111 | | 1,111,111,111 | |
| ⋮ | ⋮ | | | |
| 8192d | 10,000,000,000,000 | | 0,000,000,000 | |
| 8193d | 10,000,000,000,001 | | 0,000,000,001 | |
| A_9 ⋮ | ⋮ | 1000 | ⋮ | A_9 |
| 9214d | 10,001,111,111,110 | | 1,111,111,110 | |
| 9215d | 10,001,111,111,111 | | 1,111,111,111 | |
| 9216d | 10,010,000,000,000 | | 0,000,000,000 | |
| 9217d | 10,010,000,000,001 | | 0,000,000,001 | |
| A_10 ⋮ | ⋮ | 1001 | ⋮ | A_10 |
| 10238d | 10,011,111,111,110 | | 1,111,111,110 | |
| 10239d | 10,011,111,111,111 | | 1,111,111,111 | |

FIG.6

ON-CHIP MULTIPLEXING PIXEL CONTROL CIRCUIT

TECHNICAL FIELD

The present invention belongs to the technical field of CMOS image sensors, and particularly relates to a multiplexing pixel control circuit for a super-large area array splicing CMOS image sensor, that is, an on-chip multiplexing pixel control circuit.

BACKGROUND

Image sensors are mainly configured for collecting digital images and converting collected optical signals into electric signals. At present, large-scale commercial image sensors are mainly classified into two types: Charge-coupled Device (CCD) and Complementary Metal Oxide Semiconductor (CMOS). Compared with CCD image sensors, CMOS image sensors are advantageous in low power consumption, low cost and high compatibility, which are widely used in aerospace, biotechnology and consumer electronics.

With the expansion of application range, consumers put forward higher requirements for image size, leading to an increasing demand for large-scale image sensors. Traditional methods for designing image sensors often only focus on the improvement of resolution or frame rate, but ignore the process requirements caused by the increase in chip size. High process requirements are difficult to implement, resulting in an increasing manufacturing cost. Therefore, there is an urgent need for an image sensor design structure that can support splicing and layout multiplexing to lower the chip manufacturing threshold. At present, a pixel row control circuit for controlling row windowing in an image sensor generally adopts a traditional decoding circuit, which is difficult to overcome the defect of incapability of multiplexing. Therefore, how to improve the pixel row control circuit, with a simple control method, a relatively small circuit structure and a multiplexing design, becomes a current design difficulty.

Chinese patent CN104796636B proposes a multiplexing pixel control circuit for a super large area array splicing CMOS image sensor, which includes L levels of serial pixel control sub-circuits A, each serial pixel control sub-circuit A includes K level serial pixel control sub-circuits B and a windowing address gating circuit, each pixel control sub-circuit B includes W levels of minimum pixel control sub-circuits C, thereby realizing the windowing function of the multiplexing circuit. The control circuit of this patent has a simple structure, reliable control, excellent expandability and multiplexing, can be applied to CMOS image sensor chip circuits with different area array scales. However, the circuit has the following problems that need to be improved:

1. The windowing starting position and the windowing ending position are fixed, the starting row and the window size of the window are fixed, which cannot realize the random windowing function.

2. An address difference circuit and a complex minimum pixel control sub-circuit C are externally arranged, so that the control method is complex.

SUMMARY

Based on the problems in the prior art, the present invention is intended to reduce the manufacturing threshold of large area array and large chip size by providing a multiplexing pixel control circuit for a super-large area array splicing CMOS image sensor. The circuit can generate row gating control signals for the image sensor, support multiple operating modes such as windowing and merging for the image sensor, and has the characteristics of simple control, simple structure, multiplexing, and good portability.

The present invention provides an on-chip multiplexing pixel control circuit for controlling a splicing super-large area array CMOS image sensor, including at least one multiplexing unit, each multiplexing unit includes L levels of serial pixel control sub-circuits and a windowing address gating circuit; each level of serial pixel control sub-circuit includes a row decoding buffer circuit, a row decoding circuit and a combinational logic circuit; each windowing address gating circuit includes a group address buffer circuit, an adder, a group decoding address buffer circuit, and a group decoding circuit; the group address buffer circuit is configured to output a group address reference signal to the adder; the group decoding circuit is configured to receive an output signal of the adder and a group decoding address of the group decoding address buffer circuit, and perform comparison and selection to output a group decoding signal; a receiving terminal of the row decoding circuit is connected to an output terminal of the row decoding buffer circuit; the combinational logic circuit is respectively connected to an output terminal of the row decoding circuit and an output terminal of the group decoding circuit through an AND gate circuit, and configured to output a reset signal, a transmission signal and a row gating control signal of a pixel.

Beneficial Effects of the Present Invention

Compared with the prior art, the present invention includes multiple multiplexing units A, each multiplexing unit A includes L levels of serial pixel control sub-circuits ROW and a sub-circuit C. Through the different positions of the multiplexing unit A in the whole chip and the connection relationship between the input and output of the sub-circuit C, N group address input terminals D<N:1> of the sub-circuit C have different group address reference signals, which are compared with a group decoding address to realize group decoding and gate the multiplexing unit A. Meanwhile, the circuit ROW in the multiplexing unit A is compared with a row decoding address to realize exposure and readout control of a corresponding row of the multiplexing unit A, thereby realizing the random windowing and unlimited windowing size of the multiplexing circuit, and realizing the normal exposure and readout function of the whole chip. The control circuit of the present invention is simple in structure and reliable in control, and has excellent expandability and multiplexing capability, which can be applied to CMOS image sensor chip circuits with different area array scales.

DESCRIPTION OF EMBODIMENTS

In order to make the objects, technical solutions and advantages of the present invention more apparent, the technical solutions in the embodiments of the present invention are clearly and completely described below with reference to the accompanying drawings, and it is obvious that the described embodiments are only a part of the embodiments of the present invention, and not all of the embodiments.

An on-chip multiplexing pixel control circuit is provided according to the present invention, which is configured to control a splicing super-large area array CMOS image sensor. The multiplexing pixel control circuit includes at least one multiplexing unit, each including L levels of serial pixel control sub-circuits and a windowing address gating circuit. Each level of serial pixel control sub-circuit includes a row decoding buffer circuit, a row decoding circuit and a combinational logic circuit. Each windowing address gating circuit includes a group address buffer circuit, an adder, a group decoding address buffer circuit, and a group decoding circuit. The group address buffer circuit is configured to output a group address reference signal to the adder. The group decoding circuit is configured to receive an output signal of the adder and a group decoding address of the group decoding address buffer circuit, and perform comparison and selection to output a group decoding signal. A receiving terminal of the row decoding circuit is connected to an output terminal of the row decoding buffer circuit. The combinational logic circuit is respectively connected to an output terminal of the row decoding circuit and an output terminal of the group decoding circuit through an AND gate circuit, and is configured to output a reset signal, a transmission signal and a row gating control signal of a pixel.

Figure 1:
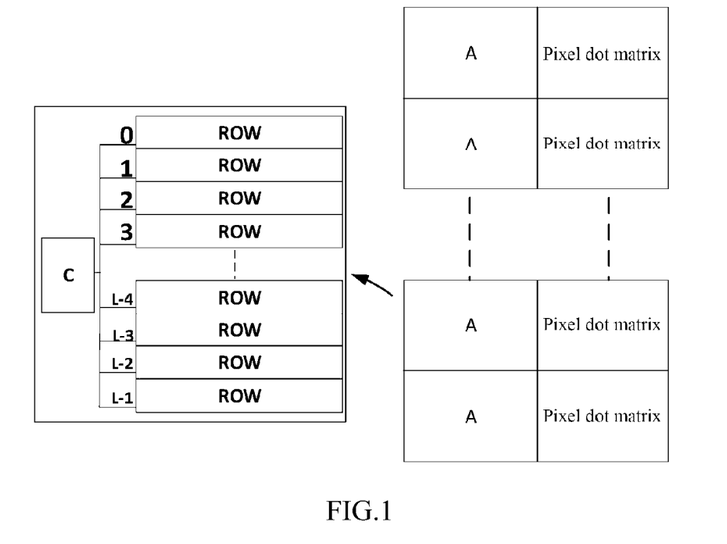
FIG. 1 is a schematic structural diagram according to the present invention.

In an embodiment, the present invention includes R levels of multiplexing pixel control sub-circuits A, each level of multiplexing pixel control sub-circuit A can generate a control signal for L rows of pixels, thereby being able to generate row control signals in an image sensor with a pixel array scale of R×L, each multiplexing pixel control sub-circuit A is a minimum multiplexing unit and includes L levels of pixel control sub-circuits ROW and a sub-circuit C, the L levels of pixel control sub-circuit ROW and the windowing address gating circuit C are combined into a basic windowing unit, and the L levels of pixel control sub-circuits ROW generate control signals for L rows of pixels.

Figure 2:
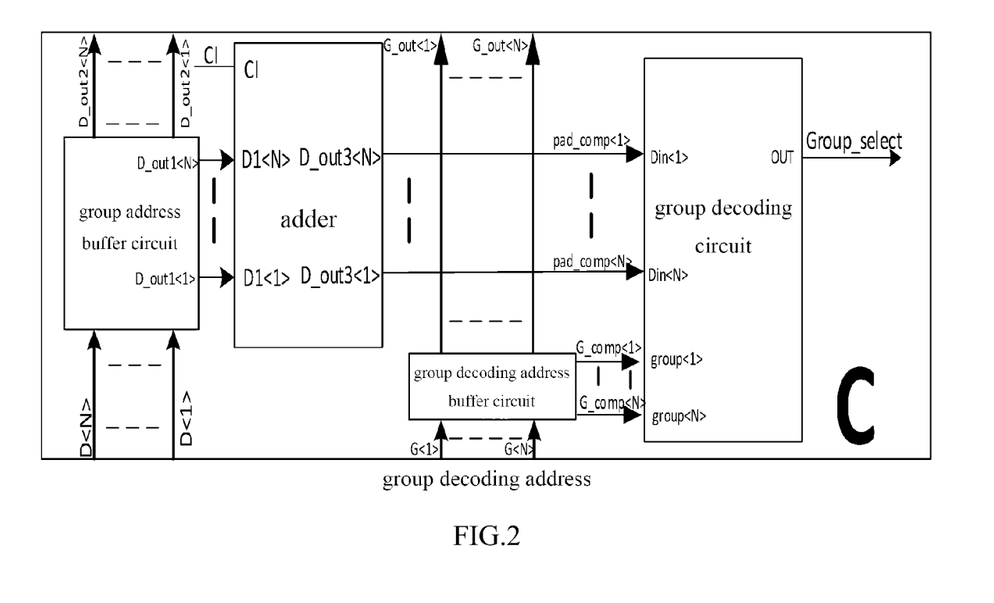
FIG. 2 is a block diagram of a windowing address gating circuit according to the present invention.

Based on the above embodiment, as shown in FIG. 2, the windowing address gating circuit C includes a group address buffer circuit, an adder circuit, a group decoding address buffer circuit, and a group decoding circuit.

In an embodiment, the group address buffer circuit includes N input terminals D<N:1>, N first output terminals D_out1<N:1>, and N second output terminals D_out2<N:1>. The N first output terminals D_out1<N:1> are connected in parallel to a respective one of N input terminals D<N:1> of the adder, and the second output terminals are connected to a respective one of first output terminals of the group address buffer circuit of a previous level or a next level. Of course, the first output terminals of the first level or the last level are connected to an external address difference signal.

In an embodiment, the adder circuit includes a carry input CI, N second input terminals D1<N:1>, and N third output terminals D_out3<N:1>. The carry input CI is connected to an external input CI, and the N third output terminals D_out3<N:1> are connected in parallel to a respective one of N input terminals Din<N:1> of the group decoding circuit.

In an embodiment, the group decoding address buffer circuit includes N input terminals G<N:1>, N comparison output terminals G_comp<N:1> and N fourth output terminals G_out<N:1>. The N input terminals G<N:1> are connected to a respective one of N output terminals of the group address buffer circuit of a previous level, the N comparison output terminals G_comp<N:1> are connected to a respective one of N input terminals of the group decoding circuit, and the N fourth output terminals G_out<N:1> are directly output and connected to the a respective one of N input terminals G<N:1> of a next level of group decoding address buffer circuit of the multiplexing unit A.

In an embodiment, the group decoding circuit includes N input terminals Din<N:1>, N input terminals Group<N:1>, and an output terminal OUT which is connected to input terminals Group_select of the L levels of pixel control sub-circuits ROW.

Figure 3:
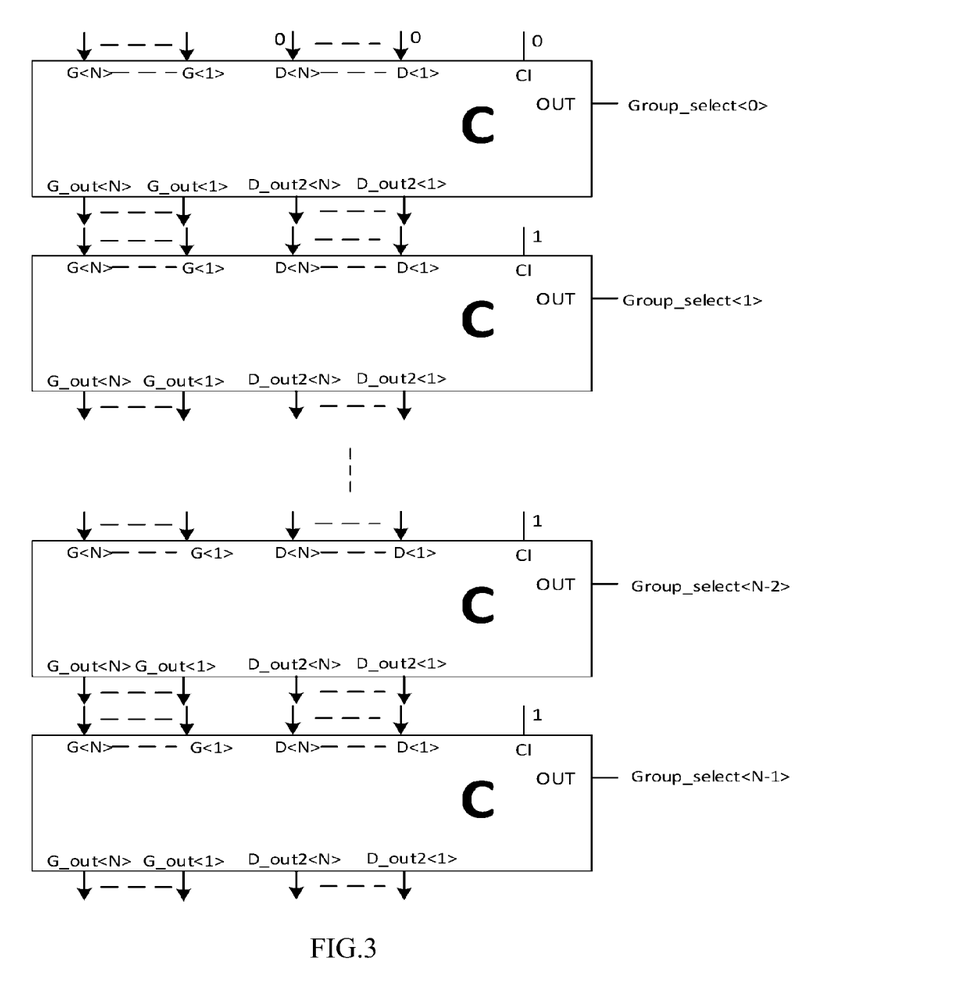
FIG. 3 is a block diagram illustrating an overall structure of N group address buffer circuits according to the present invention.

In an embodiment, as shown in FIG. 3, which illustrates an overall structure of the N group address buffer circuits. In the $0^{th}$ group, an input CI and N group address buffer circuit input terminals D<N:1> are all input with a signal 0, and N group decoding address buffer circuit input terminals G<N:1> are input externally with a group decoding address. From the $1^{st}$ group to the $(N-1)^{th}$ group, the input CI is connected with a high level signal 1, the N group address buffer circuit input terminals D<N:1> are connected with a respective one of the N second output terminals D_out2<N:1> of a previous group, the N group decoding address input terminals G<N:1> are connected with a respective one of the N group decoding address output terminals G_out<N:1> of the previous group. From the $0^{th}$ group to the $(N-1)^{th}$ group, the group selection output terminal Group_select is connected to the group itself, and the N group address input terminals D<N:1> of the $B^{th}$ multiplexing pixel control circuit have a binary sequence which is a binary representation of the decimal number B, the binary sequence is compared with the group decoding address to realize selection of different multiplexing unit modules A.

It should be noted that, since the embodiments of the present invention focus on the output and input terminals of the circuit, the output and input terminals of the module/unit/device/circuit are described herein. It should be understood by those skilled in the art that the input and output terminals of the module/unit/device/circuit correspond to signals in practice.

Figure 4:
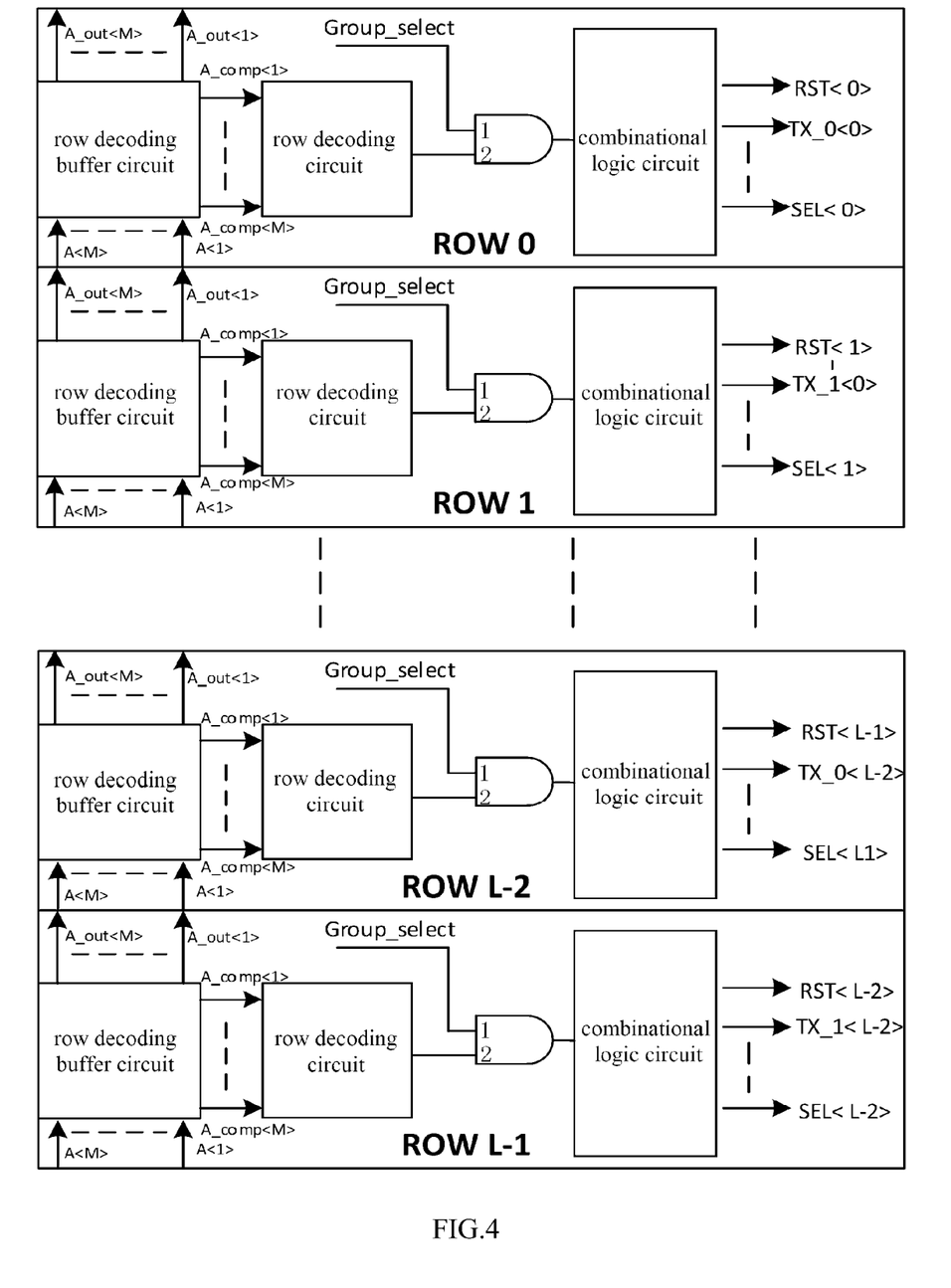
FIG. 4 is a block diagram of L levels of serial pixel control sub-circuit according to the present invention.

As shown in FIG. 4, the pixel control sub-circuit ROW includes a row decoding buffer circuit, a row decoding circuit, an AND gate and a combinational logic circuit. The row decoding buffer circuit includes M input terminals A<M:1>, M comparison output terminals A_comp<M:1> and M output terminals A_out<M:1>. The M input terminals A<M:1> are connected in parallel to a respective one of M output terminals of a previous row of row decoding buffer circuit, the M output terminals A_comp<M:1> are connected in parallel to a respective one of input terminals of the row decoding circuit, and the M output terminals A_out<M:1> are connected in parallel to a respective one of M input terminals A<M:1> of a next row of row decoding buffer circuit. The row decoding circuit includes M input terminals and an output terminal, and the output terminal of the row decoding circuit is connected to the second input terminal of the AND gate. The AND gate includes two input terminals and an output terminal, where one input terminal is connected to the output terminal Group_select of the group decoding circuit, and the other input terminal is connected to the output terminal of the row decoding circuit. The output terminal of the AND gate is connected to an input terminal of the combinational logic circuit. The combined logic circuit includes the input terminal, a RST output terminal, a TX output terminal and a SEL output terminal, where the RST output terminal, the TX output terminal and the SEL output terminal are respectively connected with a RST reset terminal, a TX transmission terminal and a SEL row selection terminal of a corresponding row of pixels.

Compared with the prior art, the present invention includes N serial pixel control sub-circuits A, each serial pixel control sub-circuit A includes L levels of serial pixel control sub-circuits ROW and a sub-circuit C. Through the different positions of the multiplexing unit A in the whole chip and the connection relationship between the input and output of the sub-circuit C, N group address input terminals D<N:1> of the sub-circuit C have different group address reference signals, which are compared with a group decoding address to realize group decoding and gate the multiplexing unit A. Meanwhile, the circuit ROW in the multiplexing unit A is compared with a row decoding address to realize exposure and readout control of a corresponding row of the multiplexing unit A, thereby realizing the random windowing and unlimited windowing size of the multiplexing circuit, and realizing the normal exposure and readout function of the whole chip. The control circuit of the present invention is simple in structure and reliable in control, and has excellent expandability and multiplexing capability, which can be applied to CMOS image sensor chip circuits with different area array scales.

Furthermore, for the L levels of ROW in the multiplexing unit A, wherein L is an even number. Through the design of the circuit ROW, the same pixel control time sequence signal and different pixel control time sequences can be generated for an odd row of pixels and an even row of pixels, so that the function of controlling exposure and readout of a pixel area array can be realized, and the random windowing and pixel combination functions can be supported.

This embodiment provides a multiplexing pixel control circuit for a super-large area array splicing CMOS image sensor, the circuit generates row control signals for a pixel area array of 10240×10240, the pixel structure is 2.5T, the circuit is required to be multiplexed every 1024 rows and can realize random windowing and unlimited windowing size. This embodiment includes a 10 levels of multiplexing pixel control sub-circuit A, each level of multiplexing pixel control sub-circuit A may generate a control signal for 1024 rows of pixels, thereby being able to generate row control signals in an image sensor with a pixel array scale of 10×1024, each multiplexing pixel control sub-circuit A is a minimum multiplexing unit. The multiplexing pixel control sub-circuit A includes 1024 levels of pixel control sub-circuits ROW and a sub-circuit C.

There are 10 levels of the multiplexing pixel control circuit A, that is, R=10. As $2^{N-1}+1 \leq R \leq 2^N$, N=4, a 4-bit binary code is generated corresponding to the decimal order of the multiplexing unit. Each level of multiplexing pixel control sub-circuit A can generate a control signal for 1024 rows of pixels, M=10.

Figure 5:
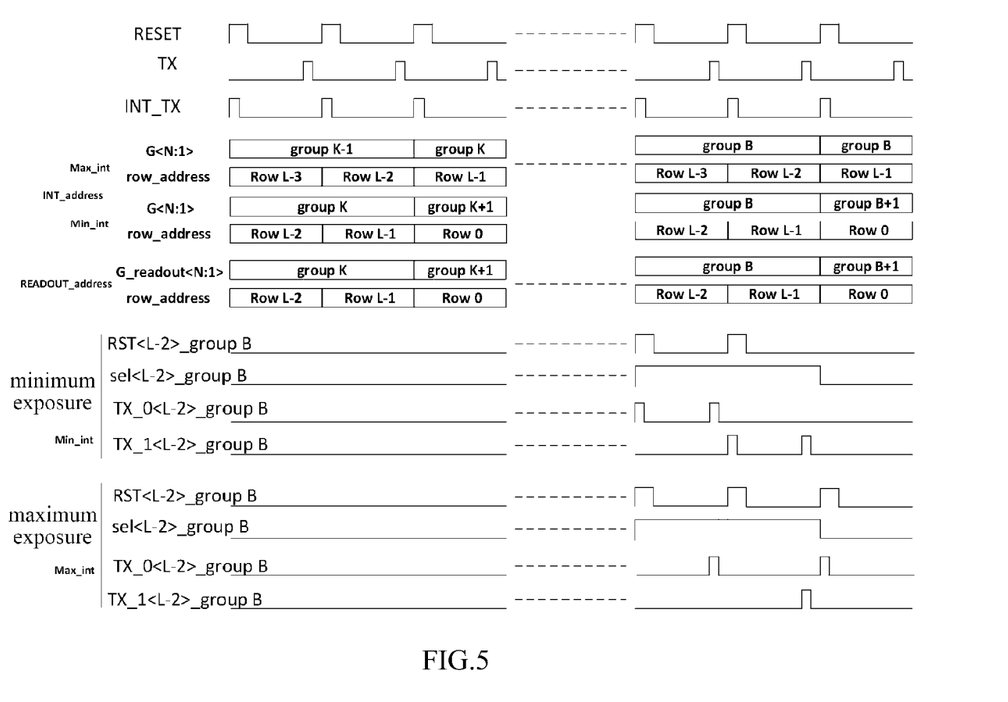
FIG. 5 is a schematic diagram of a timing implementation scheme according to the present invention.

The multiplexing pixel control circuit is applied to a 2.5T pixel structure sharing a pixel reset tube and a row selection tube, and outputting signals include TX_0, TX_1, SEL and RST, to control the transmission tube of odd rows, the transmission tube of even rows, the row selection tube and the reset tube respectively. The timing implementation scheme is shown in FIG. 5.

Figure 6:
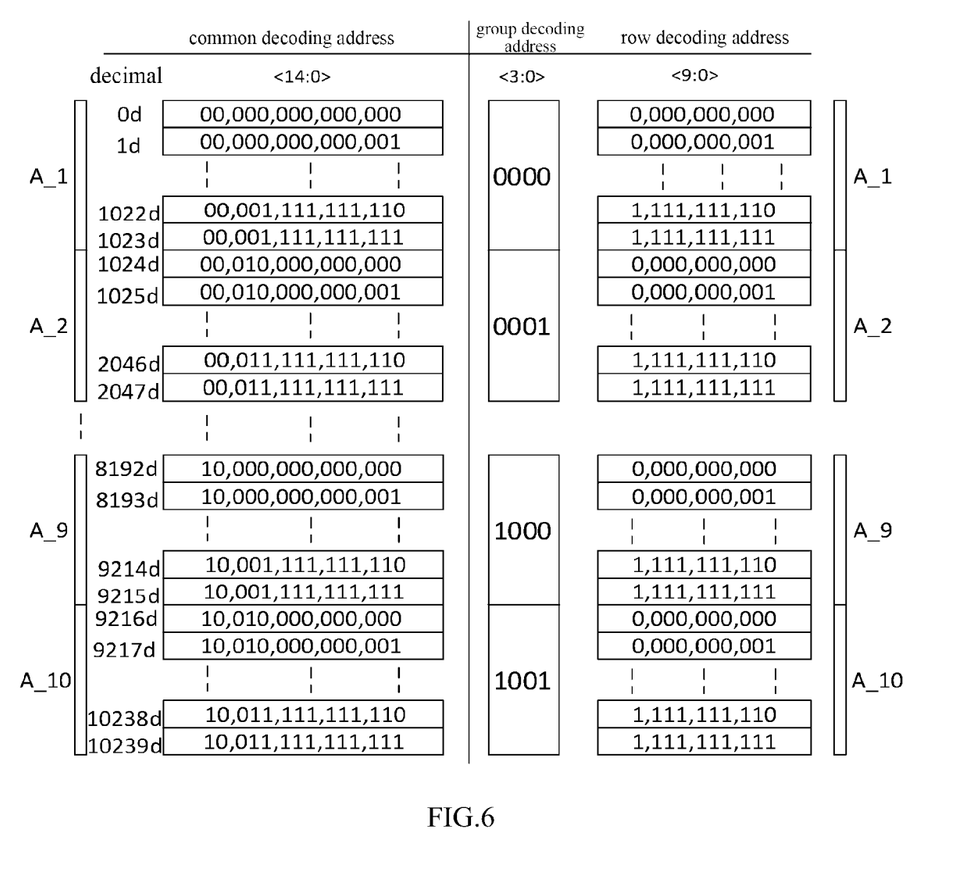
FIG. 6 is a diagram illustrating a relationship between a common decoding address and a group decoding address and a row decoding address of the present invention.

The relationship between the common decoding address and the group decoding address and the row decoding address is shown in FIG. 6, the common decoding address generates 10240 rows of exposure and readout time sequence signals of a large area array image sensor from 0 to 10239 rows through the row decoding circuit. The decoding address of the pixel array 10240×10240 in this example includes two parts of row decoding address and group decoding address, in each level of pixel control sub-circuit A, the row decoding address changes circularly from 0000000000 to 1111111111, while the group decoding address of the pixel control sub-circuit A changes from 0000 to 1001, thus generating 10240 rows of address. The specific decoding relationship between the group decoding address and the row decoding address is shown.

The timing implementation of the integral process is first described. When the integral is started, the integral decoding address of the $K^{th}$ group is outputted from the integral address G<N:1>, which is compared with the integral address D<N:1> of the $K^{th}$ group of the reset unit pixel control sub-circuit A, to gate the reset unit pixel control sub-circuit A with decimal K. Meanwhile, the integral decoding address code of the $(L-2)^{th}$ row is outputted from the row decoding address row_address, which is compared with the row decoding circuit, RST<L-2> and TX_0<L-2> are simultaneously opened to gate RST and TX row time sequence control signals of the $(L-2)^{th}$ row of the $K^{th}$ reset unit pixel control sub-circuit A, so that exposure starting control of the $(L-2)^{th}$ row of the $K^{th}$ reset unit pixel control sub-circuit A can be realized. Similarly, during the integral processing of the next row, RST<L-2> and TX_1<L-2> are simultaneously opened, and the exposure starting control of the $(L-1)^{th}$ row of the $K^{th}$ reset unit pixel control sub-circuit A can be realized.

The timing implementation of the readout process is then described. When the readout is started, the readout address code of the $K^{th}$ group is outputted from the readout address READOUT address, which is compared with the readout address D<N:1> of the $K^{th}$ group of the reset unit pixel control sub-circuit A, to gate the reset unit pixel control sub-circuit A with decimal K. Meanwhile, the readout address code of the $(L-2)^{th}$ row is outputted from the row decoding address row_address, which is compared with the row decoding circuit, RST<L-2>, TX_0<L-2> and SEL<L-2> are simultaneously opened to gate RST, TX and SEL row time sequence control signals of the $(L-2)^{th}$ row of the $K^{th}$ reset unit pixel control sub-circuit A, so that readout control of the $(L-2)^{th}$ row of the $K^{th}$ reset unit pixel control sub-circuit A can be realized. Similarly, during the readout processing of the next row, RST<L-2>, TX_1<L-2> and SEL<L-2> are simultaneously opened, and the readout control of the $(L-1)^{th}$ row of the $K^{th}$ reset unit pixel control sub-circuit A can be realized.

In an embodiment, D<4:1> in the multiplexing pixel control circuit A is the fixed address code of the $B^{th}$ multiplexing pixel control circuit A, and G<4:1> is the group decoding address of the gating group. D<4:1> and G<4:1> are decoded by the group decoding circuit to generate the gating signal Group_select of the corresponding group in the multiplexing pixel control circuit A. Meanwhile, A<10:1> is the row decoding address of the gating row, and the row decoding address A<10:1> is decoded by the row decoding circuit to generate the row gating signal. After the row gating signal and the group gating signal Group_select are both gated, the corresponding row of the $B^{th}$ multiplexing pixel control circuit A is gated, and the final output signals RST, TX and SEL of the row are generated after combinational logic calculation. Moreover, there are no restrictions on the starting and ending positions of address decoding, and the starting and ending of any row can be controlled arbitrarily, thereby realizing random windowing and unlimited windowing size.

Signal ports of the sub-circuit C for input and output connections include an input CI, 4 group address input terminals D<4:1>, 4 group address output terminals D_out2<4:1>, N group decoding address input terminals G<4:1>, N group decoding address output terminals G_out<4:1> and a group selection output terminal Group_select. In the 0th group, the input CI and 4 group address input terminals D<4:1> are all input with a signal 0, and 4 group decoding address input terminals G<4:1> are input externally with a group decoding address. From the 1st group to the 3rd group, the input CI is connected with a high level signal 1, 3 group address input terminals D<4:1> are connected with 4 address output terminals D_out2<4:1> of a previous group, 4 group decoding address input terminals G<4:1> are connected with the 4 group decoding address output terminals G_out<4:1> of the previous group. From the 0th group to the 3rd group, the group selection output terminal Group_select is connected to the group itself, and 4 group address input terminals D<4:1> of the $B^{th}$ multiplexing pixel control circuit have a binary sequence which is a binary representation of the decimal number B, the binary sequence is compared with the group decoding address to realize selection of different multiplexing unit modules A.

Those skilled in the art can understand that all or part of the steps in the various methods of the above-mentioned embodiments can be completed by a relevant hardware instructed with a program. The program can be stored in a computer-readable storage medium, which may include: ROM, RAM, magnetic disk or CD, etc.

The objectives, technical solutions and advantages of the present invention are described in detail with reference to the above embodiments. It should be understood that the above embodiments are only preferred embodiments of the present invention and are not intended to limit the present invention. Any modification, equivalent replacement, improvement, etc. made to the present invention within the gist and principle of the present invention shall be included in the protection scope of the present invention.

The invention claimed is:

1. An on-chip multiplexing pixel control circuit for controlling a splicing super-large area array CMOS image sensor, comprising at least one multiplexing unit, each multiplexing unit comprises L levels of serial pixel control sub-circuits and a windowing address gating circuit; wherein, each level of serial pixel control sub-circuit comprises a row decoding buffer circuit, a row decoding circuit and a combinational logic circuit;

each windowing address gating circuit comprises a group address buffer circuit, an adder, a group decoding address buffer circuit, and a group decoding circuit;

the group address buffer circuit is configured to output a group address reference signal to the adder;

the group decoding circuit is configured to receive an output signal of the adder and a group decoding address of the group decoding address buffer circuit, and perform comparison and selection to output a group decoding signal;

a receiving terminal of the row decoding circuit is connected to an output terminal of the row decoding buffer circuit;

the combinational logic circuit is respectively connected to an output terminal of the row decoding circuit and an output terminal of the group decoding circuit through an AND gate circuit, and configured to output a reset signal, a transmission signal and a row gating control signal of a pixel.

2. The on-chip multiplexing pixel control circuit of claim 1, wherein the group address buffer circuit is configured to output a group address buffer comparison signal by receiving multiple group address difference signals, comprising group address difference signals outputted by a previous level or a next level of group address buffer circuit; wherein, the first level or the last level of group address difference signals are provided externally.

3. The on-chip multiplexing pixel control circuit of claim 1, wherein the group decoding address buffer circuit is configured to receive multiple group decoding address difference signals, comprising group decoding address difference signals outputted by a previous level or a next level of group decoding address buffer circuit; wherein, the first level or the last level of address difference signals are provided externally.

4. The on-chip multiplexing pixel control circuit of claim 1, wherein the at least one multiplexing unit comprises R multiplexing units, so that the multiplexing pixel control circuit generates control signals for R×L rows of pixels, and $2^{N-1} \leq R \leq 2^N - 1$, where N represents the number of bits of the group decoding address.

5. The on-chip multiplexing pixel control circuit of claim 1, wherein an integral signal input terminal in the first level of serial pixel control sub-circuit or the $L^{th}$ level of serial pixel control sub-circuit is configured to receive a M-bit binary code externally; $M = \lceil \log_2 L \rceil$, where $\lceil \ \rceil$ represents rounding down.

6. The on-chip multiplexing pixel control circuit of claim 1, wherein the number of levels of the serial pixel control sub-circuits is an even number, that is, L is an even number.

* * * * *